United States Patent [19]
Clark et al.

[11] 3,976,154
[45] Aug. 24, 1976

[54] DRIVE LINE DIFFERENTIAL APPARATUS FOR A VEHICLE

[75] Inventors: Ralph B. Clark, Morton; Howard R. Anderson, Dunlap, both of Ill.

[73] Assignee: Caterpillar Tractor Co., Peoria, Ill.

[22] Filed: Jan. 13, 1975

[21] Appl. No.: 540,751

[52] U.S. Cl. .......................... 180/24.05; 180/24.09; 180/24.11; 74/714
[51] Int. Cl.² .................... B60K 17/36; B60K 17/16
[58] Field of Search .......... 180/24.05, 24.04, 24.09, 180/44 R, 24.11, 24.12, 24.13; 74/710, 710.5, 711, 714

[56] References Cited
UNITED STATES PATENTS

| | | | |
|---|---|---|---|
| 1,608,069 | 11/1926 | Lacey et al. | 180/24.05 |
| 1,627,225 | 5/1927 | Babel et al. | 180/24.05 |
| 2,216,906 | 10/1940 | Castillo | 180/24.09 X |
| 2,267,562 | 12/1941 | Higgins | 180/24.09 X |
| 2,367,151 | 1/1945 | Stephen | 180/24.09 |
| 2,667,087 | 1/1954 | Myers | 74/710 X |
| 3,095,758 | 7/1963 | Bixby | 180/44 R X |
| 3,388,760 | 6/1968 | Christie | 180/24.09 |
| 3,706,350 | 12/1972 | Bokovoy | 180/24.09 |
| 3,792,628 | 2/1974 | Stieg | 74/714 |

*Primary Examiner*—Kenneth H. Betts
*Attorney, Agent, or Firm*—Phillips, Moore, Weissenberger, Lempio & Strabala

[57] ABSTRACT

A vehicle drive train includes a pair of drive shaft portions, and an intershaft differential connecting them. One drive shaft portion drives a pair of drive axles through a differential mechanism, each drive axle in turn driving a pair of wheels in tandem through a differential mechanism and chain and sprocket means. The other drive shaft portion drives another pair of vehicle wheels through a differential mechanism. The inter-shaft differential mechanism may be chosen to apply greater driving torque to one drive shaft portion, i.e., for example, the drive shaft portion which is utilized to drive the wheels in tandem, than is applied to the other drive shaft portion.

6 Claims, 2 Drawing Figures

DRIVE LINE DIFFERENTIAL APPARATUS FOR A VEHICLE

BACKGROUND OF THE INVENTION

This invention relates to drive train mechanisms for a vehicle, and more particularly, to a drive train mechanism for a vehicle which utilizes pairs of wheels in tandem.

It is well recognized that the tractive efforts of a four or six-wheel vehicle are substantially improved if driving torque is directed to more than one axle of the vehicle. In the case of an articulated vehicle of long wheelbase, wherein the rear wheels are more heavily loaded than the front wheels thereof, steering difficulties are known to exist, such steering difficulties stemming from resistances which are in excess of those normally encountered in shorter wheelbased vehicles. In the case of, for example, a six-wheel vehicle, if all six wheels thereof are rigidly driven, without allowance for differential motion, by the power source of the vehicle, a severe amount of tire scuffing occurs as the vehicle negotiates a turn. Under such conditions, the front wheels of the vehicle must generally run through an arc of greater radius than that of the rear wheels, and therefore would tend to rotate faster than the rear wheels. Also, slight differences in wheel radii caused by inevitable variation in tire inflation, tread wear, or variations in vehicle loads result in what is known as circumferential tire scrub. Under these conditions, a wheel having a smaller radius tends to rotate faster than one having a larger radius while both wheels cover the same distance. If the front and rear wheels are positively driven together without differential action therebetween at the same angular speed, a wheel having a smaller radius will be scraped over the ground surface. It will also be noted that such above-cited problems cause undue stress in the drive system, in turn causing additional friction therein and wear thereof.

Six-wheeled vehicles which provide for differential movement of certain wheels relative to others thereof are disclosed in U.S. Pat. No. 2,667,087 to Myers, U.S. Pat. No. 3,388,760 to Christie and U.S. Pat. No. 3,706,350 to Bokovoy. Each of these patents discloses torque transfer means including differential means associated with pairs of rear vehicle wheels which are disposed in tandem. While the differential action provided between such wheels may be effective in certain uses, it is to be understood that improvements in design for certain applications are continually being sought. In U.S. Pat. No. 2,667,087, it appears that a single differential mechanism connects with axles to drive the front pair and rear pair of rear wheels. It will be understood that such a single differential is not capable of allowing a differential motion across any single rear axle of the pair thereof. In both U.S. Pat. No. 3,388,760 and U.S. Pat. No. 3,706,350, individual differential mechanisms interconnect the forward pair of rear wheels and the rearward pair of rear wheels. However, in either of these patents, a pair of wheels in tandem are interconnected by both above-described differentials, so that an interaction of these two differential mechanisms is involved whenever differential rotation is to be provided between one and the other of a pair of wheels in tandem.

Of more general interest in this area are U.S. Pat. No. 3,457,807 to Altmann, U.S. Pat. No. 3,494,226 to Biddle, U.S. Pat. No. 3,650,349 to Cleveland et al, and U.S. Pat. No. 3,648,545 to Clancey.

SUMMARY OF THE INVENTION

It is accordingly an object of this invention to provide drive train means for a vehicle including pairs of wheels in tandem, which provides for proper transfer of power to such wheels, meanwhile allowing for effective differential action of one wheel in tandem relative to another, in an extremely simple and efficient manner.

It is a further object of this invention to provide drive train means for a vehicle which, while fulfilling the above object, includes means for driving a pair of front wheels thereof.

It is a still further object of this invention to provide drive train means for a vehicle which, while fulfilling the above objects, is extremely efficient in design and operation.

Broadly stated, the invention is in a vehicle including first wheel means adjacent one end thereof, and second wheel means adjacent the other end thereof. The first wheel means comprises four wheels, a first pair of the four wheels being disposed on one side of the vehicle generally in tandem, and a second pair of the four wheels being disposed on the other side of the vehicle generally in tandem. Further included are drive axle means, and first and second separate torque transfer means each including diffential means. The first torque transfer means and differential means thereof operatively interconnected only the drive axle means and the first pair of wheels. The second torque transfer means and differential means thereof operatively interconnect only the drive axle means and the second pair of wheels, so that driving power applied through the drive axle means drives the first pair of wheels only through the first of the first and second torque transfer means, the differential means of the first torque transfer means allowing differential rotation of one of the first pair of wheels relative to the other, and so that driving power applied through the drive axle means drives the second pair of wheels through only the second of the first and second torque transfer means, the differential means of the second torque transfer means allowing differential rotation of one of the second pair of wheels relative to the other.

BRIEF DESCRIPTION OF THE DRAWINGS

These and other objects of the invention will become apparent from a study of the following specification and drawings, in which.

DESCRIPTION OF THE PREFERRED EMBODIMENT

Figure 1:
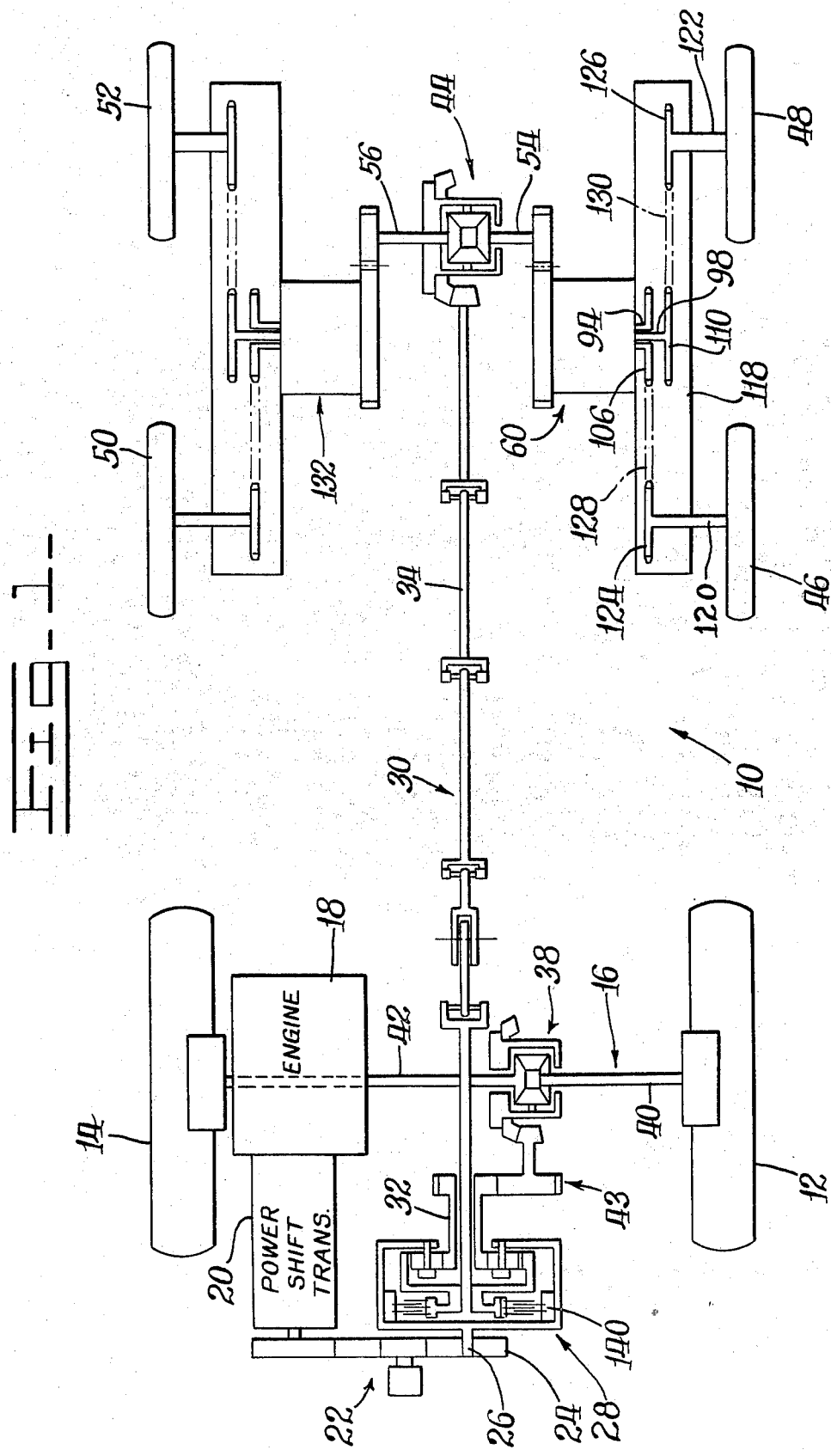
FIG. 1 is a schematic view showing the vehicle line drive components in a preferred embodiment.

Shown in FIG. 1 is a schematic plan view of a drive train 10 of a vehicle. The vehicle includes wheel means made up of front wheels 12,14 carried by a front axle 16, such front wheels being supported to provide steering of a vehicle. The vehicle also includes an engine 18 disposed adjacent the front axle 16, which delivers power through a transmission 20 and a transfer gear system 22, including a transfer gear 24. The transfer gear 24 is drivingly connected to an input shaft 26 of a torque transfer mechanism 28 including differential means. The drive train 10 includes drive shaft means 30 including a first drive shaft portion 32, and a second drive shaft portion 34. The first and second drive shaft portions 32,34 are operatively connected with the torque transfer means 28, and the intershaft portion torque transfer means 28 applies driving torque to the drive shaft portions 32,34 as described above, with the differential mechanism thereof allowing differential rotation of one drive shaft portion relative to the other. The torque transfer means 28 is of the biased-output type for normally supplying a greater driving torque therethrough to the drive shaft portion 34 than to the drive shaft portion 32. For example, the torque transfer means 28 can be so chosen as to deliver 70% of the torque to the drive shaft portion 34, and 30% of the torque to the drive shaft portion 32. It will be understood that other ratios of torque delivery are possible depending on operating requirements.

A torque transfer means 38 including differential means operatively interconnects the wheels 12,14 (through axle portions 40,42 of axle 16) and the drive shaft portion 32 (through cluster gear 43), so that driving power may be applied from the drive shaft portion 32 through the torque transfer means 38 to the wheels 12,14, meanwhile with the differential mechanism of the torque transfer means 38 allowing differential rotation of one of the wheels 12,14 relative to the other.

The drive shaft portion 34 is operatively connected with a torque transfer means 44 including differential means, located adjacent the rear of the vehicle. Four wheels 46,48, 50,52 are disposed adjacent the rear of the vehicle, a pair of wheels 46,48 being disposed on one side of the vehicle generally in tandem, and a pair of such wheels 50,52 being disposed on the other side of the vehicle generally in tandem. First and second drive axles 54,56 are included, and the torque transfer means 44 including differential means interconnect the drive shaft portion 34 and the axles 54,56, so that driving power may be applied from the drive shaft portion 34 through the torque transfer means 44 to drive the first and second drive axles 54,56, meanwhile with the differential mechanism of the torque transfer means 44 allowing differential rotation of one drive axle 54,56 relative to the other drive axle.

Figure 2:
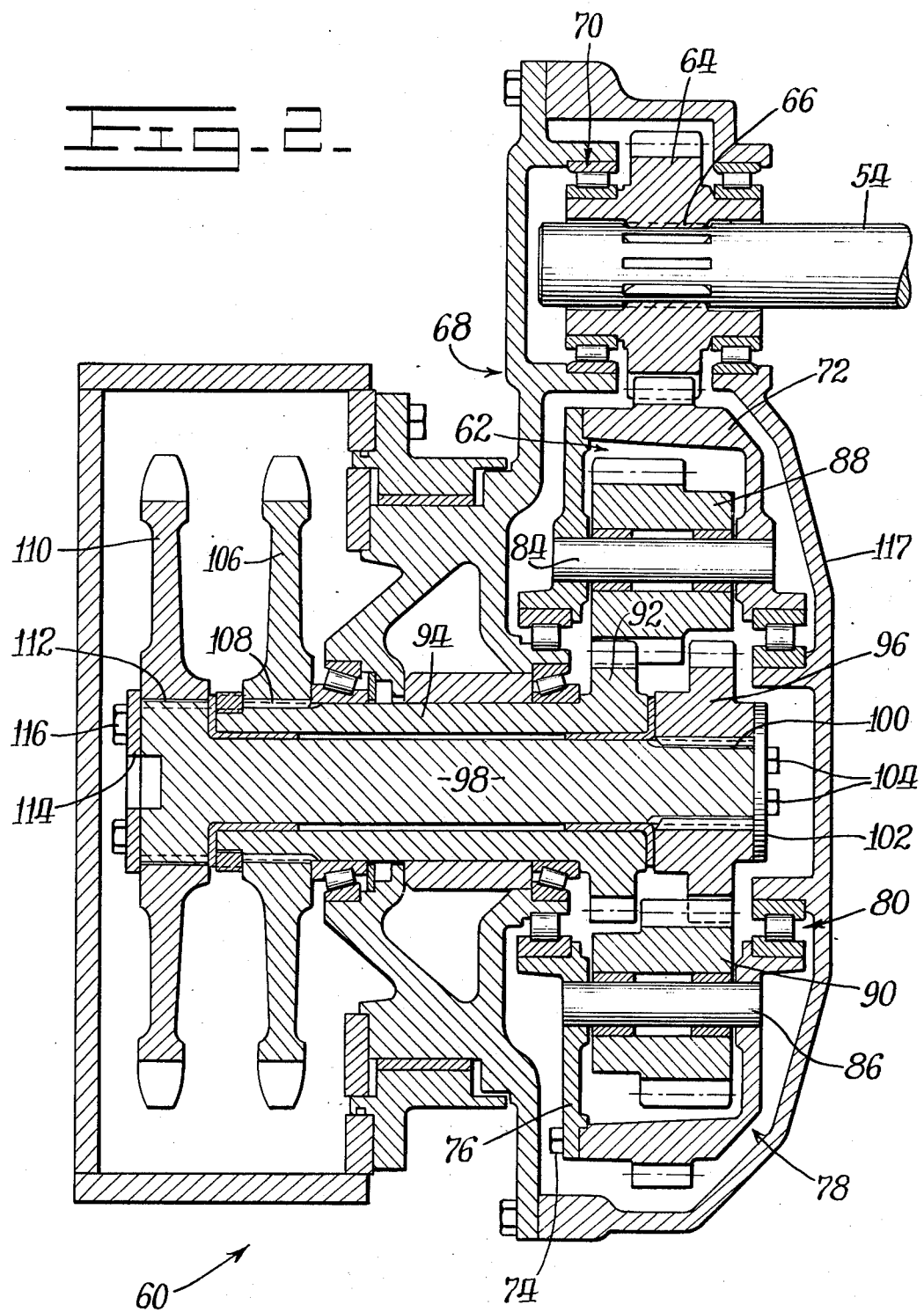
FIG. 2 is a sectional view of a rear interwheel differential mechanism of the invention.

Torque transfer means 60 are in operative connection with the drive axle 54 and the pair of wheels 46,48 in tandem, by means which will now be described in detail. The torque transfer means 60 shown in FIG. 2 in cross section includes a differential mechanism 62 of the free-spin type, wherein the drive axle 54 is attached to a pinion gear 64 by means of spline 66. Pinion gear 64 is rotatably supported in torque transfer means housing 68 by bearings 70. Input torque from drive axle 54 is transmitted from gear 64 to ring gear 72. Fixed to ring gear 72 by means of bolts 74 is a support plate 76. The entire ring gear assembly 78 is rotatably supported on bearings 80 which are retained on the stationary housings 68 and 117.

Between ring gear 72 and plate 76 are also assembled three planet gear shafts 84, and three other planet gear shafts 86, to rotatably support planet pinions 88,90 thereon respectively. The torque from ring gear 72 is divided through a path wherein the three planet gears 88 transmit torque to an output sun gear 92 which is formed as an integral part of an outer tubular shaft 94. Torque from ring gear 72 is also divided along a path wherein the three planet gears 90 transmit torque to an output sun gear 96 which is secured to an inner shaft 98 rotatably disposed in the tubular outer shaft 94, by means of spline 100, plate 102 and bolts 104 attached to the shaft 98. A sprocket 106 is secured from rotation relative to the tubular outer shaft 94 by means of splines 108, and a sprocket 110 is secured from rotation relative to the inner shaft 98 by means of splines 112, plate 114 and bolts 116 which are fixed to the shaft 98. The sprockets 106,110 are disposed in side-by-side relation. The wheels 46,48 in tandem are rotatably supported relative to a tandem housing 118 by means of shafts 120,122. A sprocket 124 is secured on shaft 120 so as to be secured from rotation relative to the wheel 46, and a sprocket 126 is secured on shaft 122 to be secured from rotation relative to the wheel 48. A chain 128 drivingly interconnects the sprocket 124 and the sprocket 106, and a chain 130 drivingly interconnects the sprocket 126 and the sprocket 110. It is to be understood that drive axle 56 is associated with wheels 50,52 in an identical manner through torque transfer means 132.

It will be seen that the torque transfer means 60 and differential means thereof operatively interconnect only the drive axle 54 and the pair of wheels 46,48, and the torque transfer means 132 and differential means thereof interconnect only the drive axle 56 and the pair of wheels 50,52. It will thus be seen that driving power applied through the drive axle means 30 drives the pair of wheels 46,48 only through the torque transfer means 60 and not through the torque transfer means 132. The differential mechanism of the torque transfer means 60 allows differential rotation of one of the pair of wheels 46,48 relative to the other. Likewise, driving power applied through the drive axle means 30 drives the pair of wheels 50,52 through only the torque transfer means 132, and not the torque transfer means 60, with the differential mechanism of the torque transfer means 132 allowing differential rotation of one of the wheels 50,52 relative to the other. In the case of wheels 46,48, driving power is in fact applied from the drive axle 54 to rotate and drive the inner and outer shafts 94,98, to in turn rotate the sprocket means 106,110, to rotate the sprocket means 126,124 through the chains 130,128, to drive the pair of wheels 46,48, meanwhile with the differential means allowing differential rotation of one of the wheels 46,48 relative to the other. The structure at the other side of the vehicle of course operates in a like manner.

A simple hand-controlled on-off valve may be included to actuate a clutch included in torque transfer means 28 to permit the operator to avoid differential action of such torque transfer means 28. The differential mechanism of the torque transfer means 38 may with advantage be of the limited slip type. The differential mechanism of the torque transfer means 38 provides a high degree of independent freedom for each wheel 12,14, to increase vehicle mobility and reduce the amount of steering effort required. The inter-shaft portion torque transfer means 28 may be substituted by an unlocked planetary arrangement to divide torque substantially evenly between the drive shaft portion 32 and the drive shaft portion 34, and between the front wheels and rear wheels. That is, the torque transfer means 38 and the torque transfer means 44 will receive substantially equal input torque. It will be understood therefore that lower traction conditions will generally cause the more lightly loaded front axle to spin or slip. Maximum transmission torque is thereby limited to a lower value. On substantially good footing, mobility is virtually unaffected, and at high traction effort the differential means of the torque transfer means 38 and the differential mechanism of the torque transfer means 44 do not interfere with proper torque distribution due to such unloading feature. Under very poor traction conditions, engagement of a clutch 140 included with the torque transfer means 28 locks out the inter-shaft portion differential action to increase traction without causing excessive transmission output torque.

As a substitute for torque transfer means 28, the inter-shaft portion torque transfer means 28 may with advantage take the configuration substantially as shown in copending application Ser. No. 513,735, filed Oct. 10, 1974, entitled "Limited Slip Differential With Clutch Control Means," invented by Ralph B. Clark (assigned to the assignee of this invention).

It will be seen that herein is provided drive train means for a vehicle which offers an extremely high degree of achievement of traction during various vehicle operating conditions. Meanwhile, the system overall is extremely simple and effective in design and operation.

What is claimed is:

1. In a vehicle including first wheel means adjacent one end thereof, and second wheel means adjacent the other end thereof, said first wheel means comprising four wheels, a first pair of said four wheels disposed on one side of the vehicle generally in tandem, a second pair of said four wheels disposed on the other side of the vehicle generally in tandem, drive axle means, first and second separate torque transfer means each including differential means, the first torque transfer means and differential means thereof operatively interconnecting only the drive axle means and the first pair of wheels, the second torque transfer means and differential means thereof operatively interconnecting only the drive axle means and the second pair of wheels, so that driving power applied through the drive axle means drives the first pair of wheels through only the first of the first and second torque transfer means, the differential means of the first torque transfer means allowing differential rotation of one of the first pair of wheels relative to the other, and so that driving power applied through the drive axle means drives the second pair of wheels through only the second of the first and second torque transfer means, the differential means of the second torque transfer means allowing differential rotation of one of the second pair of wheels relative to the other, wherein the drive axle means comprise a first drive axle and a second drive axle, the first torque transfer means being in operative connection with the first drive axle and the first pair of wheels, the second torque transfer means being in operative connection with the second drive axle and the second pair of wheels, further comprising drive shaft means, and third torque transfer means including differential means, interconnecting the drive shaft means and first and second drive axles, so that driving power may be applied from the drive shaft means through the third torque transfer means to drive the first and second drive axles, meanwhile with the differential means of the third torque transfer means allowing differential rotation of one drive axle relative to the other drive axle, wherein the second wheel means comprise first and second wheels, one disposed on either side of the vehicle, and further comprising fourth torque transfer means including differential means operatively interconnecting the drive shaft means and first and second wheels of the second wheel means, so that driving power may be applied from the drive shaft means through the fourth torque transfer means to the first and second wheels of the second wheel means, meanwhile with the differential means of the first torque transfer means allowing differential rotation of one of the first and second wheels of the second wheel means relative to the other.

2. The apparatus of claim 1 wherein the drive shaft means comprise a first drive shaft means portion operatively connecting with said third torque transfer means, and a second drive shaft means portion operatively connected with said fourth torque transfer means, and inter-shaft portion torque transfer means including differential means, interconnecting the first drive shaft means portion and the second drive shaft means portion, to allow differential rotation of one of said first and second drive shaft means portions relative to the other.

3. The apparatus of claim 2 wherein the inter-shaft portion torque transfer means comprise biased-output means for normally supplying a greater driving torque therethrough to the first drive shaft means portion than to the second drive shaft means portion.

4. A wheel structure comprising a pair of wheels disposed generally in tandem, drive axle means, and torque transfer means including diferential means, operatively interconnecting only the drive axle means and said pair of wheels, so that driving power applied through the drive axle means to the torque transfer means drives the wheels, the differential means of the torque transfer means allowing differential rotation of one of the wheels relative to the other, wherein the torque transfer means comprise a tubular outer shaft, and an inner shaft rotatably disposed therein, and further comprising first sprocket means being secured from rotation relative to the tubular outer shaft, second sprocket means secured from rotation relative to the inner shaft, third sprocket means secured from rotation relative to the first wheel, fourth sprocket means secured from rotation relative to the second wheel, first chain means interconnecting the first and third sprocket means, and second chain means interconnecting the second and fourth sprocket means, so that driving power may be applied from the axle means through the torque transfer means to drive the inner and outer shafts thereof, to in turn rotate the first and second sprocket means, to rotate the third and fourth sprocket means through the first and second chain means, to drive the pair of wheels, meanwhile with the differential means allowing differential rotation of one of the pair of wheels relative to the other.

5. The wheel structure of claim 4 wherein the first and second sprocket means are disposed in side-by-side relation.

6. The wheel structure of claim 5 wherein the differential means comprise planetary gear differential means.

* * * * *